(12) United States Patent
Zimmerman et al.

(10) Patent No.: US 8,050,906 B1
(45) Date of Patent: Nov. 1, 2011

(54) SYSTEMS AND METHODS FOR TRANSLATING TEXT

(75) Inventors: Shannon Zimmerman, River Falls, WI (US); Angela Zimmerman, River Falls, WI (US); Joseph Bechtel, River Falls, WI (US); Jeffrey Kent, Hudson, WI (US)

(73) Assignee: Sajan, Inc., River Falls, WI (US)

( * ) Notice: Subject to any disclaimer, the term of this patent is extended or adjusted under 35 U.S.C. 154(b) by 844 days.

(21) Appl. No.: 10/452,774

(22) Filed: Jun. 1, 2003

(51) Int. Cl.
*G06F 17/28* (2006.01)

(52) U.S. Cl. .............. 704/2; 704/4; 704/5; 704/8; 704/9

(58) Field of Classification Search .......... 704/2; 707/2, 707/3
See application file for complete search history.

(56) References Cited

U.S. PATENT DOCUMENTS

| | | | | |
|---|---|---|---|---|
| 6,085,162 | A * | 7/2000 | Cherny ................... | 704/277 |
| 6,393,388 | B1 * | 5/2002 | Franz et al. ................ | 704/4 |
| 6,393,389 | B1 * | 5/2002 | Chanod et al. ............ | 704/7 |
| 6,598,015 | B1 * | 7/2003 | Peterson et al. .......... | 704/3 |
| 7,020,601 | B1 * | 3/2006 | Hummel et al. ............ | 704/2 |
| 7,356,458 | B1 * | 4/2008 | Gonos ....................... | 704/8 |
| 2001/0047255 | A1 * | 11/2001 | Fuji ........................... | 704/10 |
| 2002/0002452 | A1 * | 1/2002 | Christy et al. ............. | 704/3 |
| 2002/0123878 | A1 * | 9/2002 | Menke ....................... | 704/2 |
| 2002/0165707 | A1 * | 11/2002 | Call ........................... | 704/2 |
| 2003/0004702 | A1 * | 1/2003 | Higinbotham ............ | 704/2 |
| 2003/0046058 | A1 * | 3/2003 | Stuckler et al. ........... | 704/7 |
| 2003/0221171 | A1 * | 11/2003 | Rust et al. ................. | 715/532 |
| 2004/0049374 | A1 * | 3/2004 | Breslau et al. ............ | 704/2 |
| 2007/0225965 | A1 * | 9/2007 | Fallen-Bailey et al. ... | 704/9 |

* cited by examiner

*Primary Examiner* — Leonard Saint Cyr
(74) *Attorney, Agent, or Firm* — Schwegman, Lundberg & Woessner, P.A.

(57) ABSTRACT

Systems and methods for translating text are disclosed. The systems and methods parse source text into source text segments and style attributes that are associated with the source text segments. A database may be queried for translation text segments in a desired language that match the source text segment. The match criteria may be exact or fuzzy match. In addition, a context criterion may be used do determine matches. The context criterion may include a company criterion, an intended use criterion, a product criterion, or other user specified criterion. Translation segments that match the source segment are then output using the style of the source segment.

14 Claims, 17 Drawing Sheets

SYSTEMS AND METHODS FOR TRANSLATING TEXT

FIELD

The present invention relates generally to computer systems, and more particularly to computerized systems for translating text in documents.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Sajan, Inc. All Rights Reserved.

BACKGROUND

The ability to easily communicate on a global scale has made it possible for businesses of all sizes to operate on an international, if not global basis. The Internet has made electronic business a reality, creating opportunities previously unavailable to all but the largest businesses. However, doing business on an international level also presents challenges. For example, it is often necessary to communicate across a number of different languages. Examples of such communications include internal communications, external communications, product information, sales training, sales aids, packaging information and advertising. Thus while it is easier than ever to present a message anywhere in the world, it is not easy to make that message understood.

As a result, there is a need in the art for the present invention.

SUMMARY

The above-mentioned shortcomings, disadvantages and problems are addressed by the present invention, which will be understood by reading and studying the following specification.

The present invention includes systems and methods that parse source text into source text segments and style attributes that are associated with the source text segments. A database may be queried for translation text segments in a desired language that match the source text segment. The match criteria may be exact or fuzzy match. In addition, a context criterion may be used do determine matches. The context criterion may include a company criterion, an intended use criterion, a product criterion, or other user specified criterion. Translation segments that match the source segment are then output using the style of the source segment.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 4A-4E are illustrations of a web-based user interface according to various embodiments of the invention.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

OPERATING ENVIRONMENT

Figure 1A:
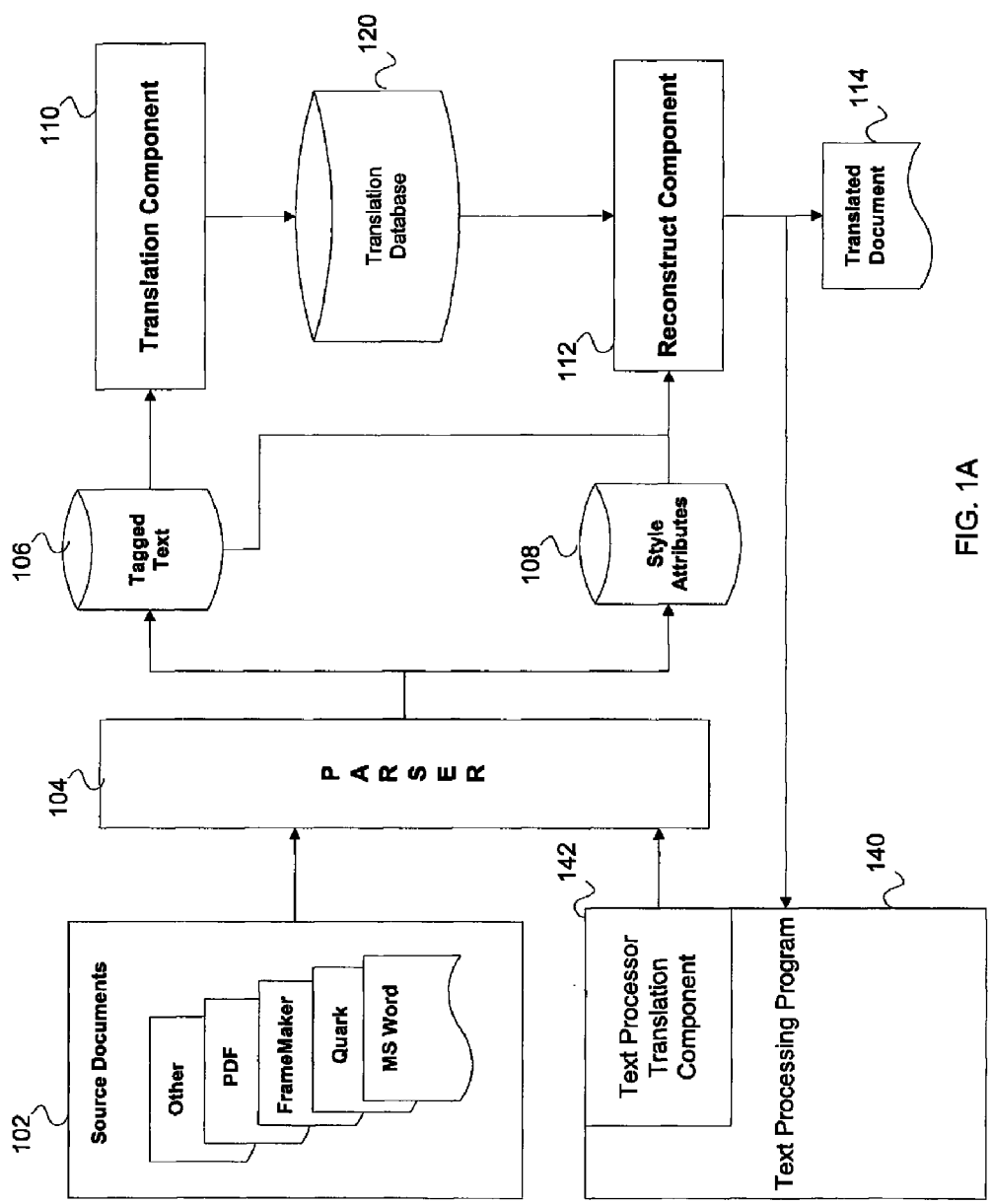
FIGS. 1A and 1B are block diagrams illustrating the major components of an operating environment in which different embodiments of the invention can be practiced.
Figure 1B:
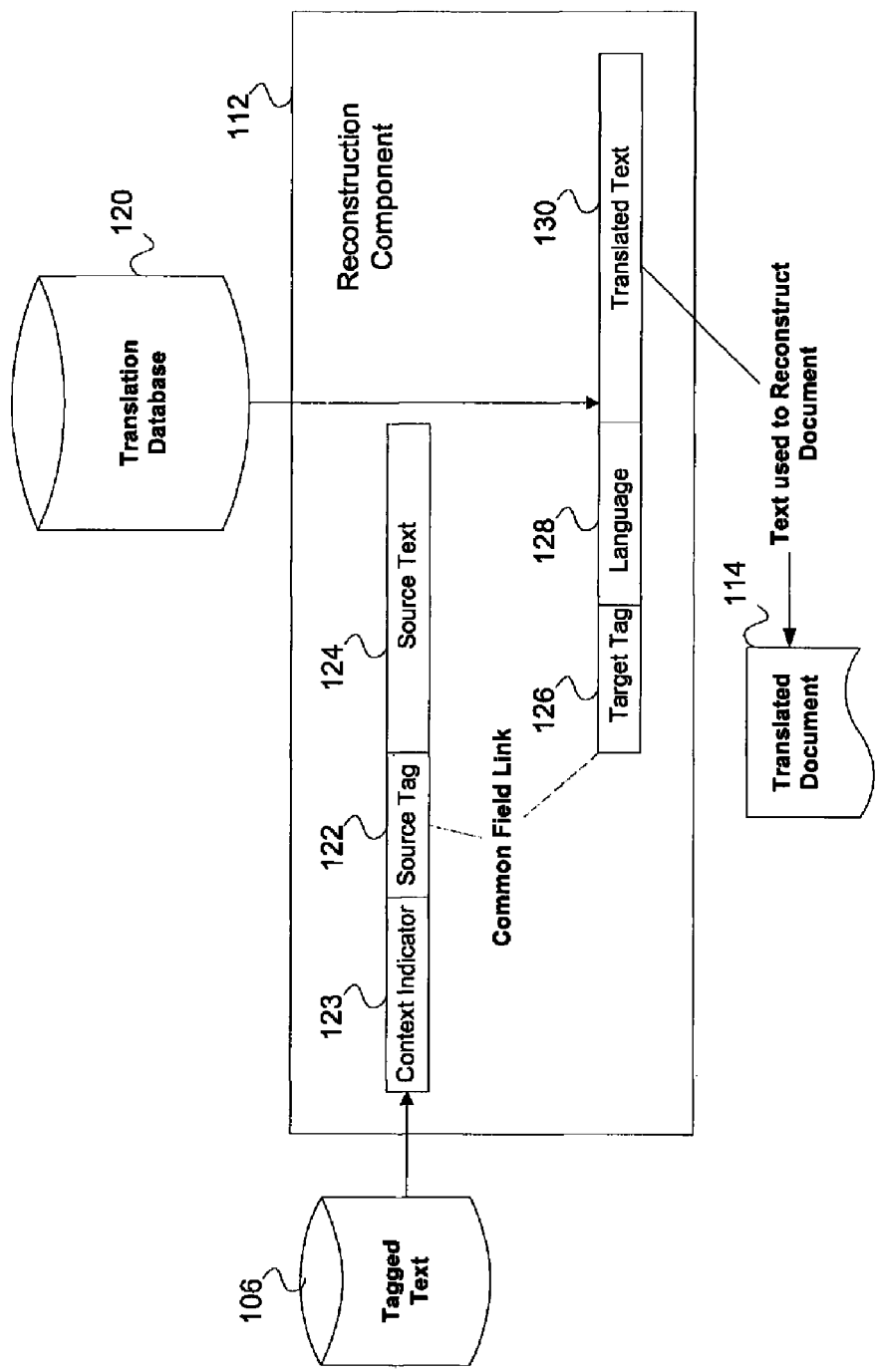

FIGS. 1A and 1B are block diagrams illustrating the major components of an operating environment in which different embodiments of the invention can be practiced. FIG. 1A illustrates the major components of a text translation system 100 according to various embodiments of the invention. In some embodiments, the operating environment includes a parser 104, a translation component 110, a translation database 120, and a reconstruction component 112.

Parser component 104 reads one or more source documents 102 and parses the document into one or more segments of tagged text 106. Source documents 102 may be any type of document containing text. For example, in some embodiments of the invention, source documents 102 are Microsoft Word documents. However, the invention is not limited to any particular text file format, and in alternative embodiments the source documents may be in Corel WordPerfect, Quark, FrameMaker, Adobe PDF or other text file formats. Furthermore, the text may be text defining a web page or plurality of web pages. In some embodiments, parser 104 separates style attributes from the text, leaving generally pure text segments while preserving the style attributes for later use in reconstructing the translated document.

In some embodiments, the tagged text 106 comprises a plurality of text segments, where each segment is tagged with an XML tag. However, other forms of tagging text are known in the art, and the invention is not limited to any particular tagging format. In some embodiments, tagged text 106 provides a common format for later processing stages, so later translation stages do not require specialized handling for any particular format. In some embodiments, a text segment comprises an "Expression of Complete Thought" (EOCT). An Expression of Complete Thought represents a logical segment of a communication, which may be interpreted and understood by the reader. An EOCT may comprise a sentence, but in some cases may be a smaller segment such as a header statement, section name, list item, phrase or any other type of shortened statement that is intended to represent a complete thought. Parsing into EOCTs is desirable, because word for word translation often results in incorrect grammar or inaccurate context.

In addition, parser 104 in some embodiments produces style attributes data 108. The style attributes preserve the style attributes of the source document 102. In these embodiments, the stylistic attributes that remain regardless of the translation are separated from the text requiring translation. For example, the paragraph attributes (bulleted, numbered, indentation, line spacing etc.), and text attributes including font type, font size etc. may be separated from the text to be translated. In some embodiments, style attributes data 108 is an XML/XSL style sheet.

Translation component 110, in some embodiments, receives tagged text 106 and searches the translation database 120 for matches to the source text. If a match is found in the desired target language, then the translated text is tagged with the same tag as the input tagged text segment. The translated text is then sent to the reconstruction module 112 for output.

In some embodiments of the invention, a text processing program 140 may include a translation component 142 that interfaces with parser 104. Text processing program 140 may be any type of software application that includes text processing as part of its functionality. Examples of such text processing programs include Microsoft Word, Corel WordPerfect, Adobe PDF, FrameMaker, and Quark. Other examples of programs that include text functionality include slide presentation programs such as Microsoft PowerPoint, database programs such as Microsoft Access, and spreadsheet programs such as Microsoft Excel. The invention is not limited to any particular type of text processing program.

Translation component 142 operates to receive text that a user wishes to have translated and submits the text to parser 104. The text is parsed as described above into tagged text, and submitted to translation process 110. Translation process 110 queries translation database 120 for matches, which are submitted to reconstruction component 112. Reconstruction component 112 may then provide the translated text back to text processor translation component 142 for use by the text processing program. In some embodiments text processor translation component 142 may be a "plug-in" for the text processing program. In alternative embodiments, text processor translation component 142 may comprise a library of software routines that are included in text processing program 140.

In some embodiments of the invention, text processor translation component 142 may bypass the parser 104 and directly interface with translation database 120 to query the database for appropriate translations. Additionally, in some embodiments, translation component 142 may query translation database 120 for text in the same source language as the document being processed. Text provided in the translation database 120 may be used to confirm that the current text may be readily translated, or it may be used to provide alternative text that has been translated before, or has been approved for translation. The author of the document may then use the suggested alternative text to ensure that the document may be readily translated in the future.

FIG. 1B provides further details on the operation of reconstruction component 112 used in some embodiments of the invention. As noted above, the reconstruction component 112 applies various mapped/translated languages to the tagged text 106 and in some embodiments, applies the style attributes to create or reconstruct a translated document 114.

In some embodiments, the reconstruction component 112 uses the results from the translation component 110 to create the translated document 114. As noted above, in some embodiments, the source text 124 is parsed and assigned a source tag 122 by the parser 104. The translation component receives translated target text 130 from database 120. In addition, in some embodiments, the source text also has a context indicator 123 associated with it. The context indicator provides a context for the translation. For example, translations for a source text might be different depending on whether the source being translated is text regarding medical procedures intended for a doctor and text regarding instructions being given to a patient. Similarly, different operating entities within a company may desire their own separate translations for the same text. Other examples include the organizational or business location of use (sometimes referred to as the information architecture), the intended audience, industry segment, product family, meaning, grammatical attributes etc. The invention is not limited to any particular type of context. These various types of attributes contribute to the contextual meaning of the content stored in the translation database 120. The context indicator may include one or more of the above attributes, thereby providing a mechanism for allowing contextually accurate translations. Additionally, in some embodiments, the contextual framework may vary from client to client.

The translated text 130 is assigned a target tag 126 that corresponds to source tag 122. The relationship between the source and target tags and translated text are used to determine the content of the reconstructed document. Reconstruction component 112 may preserve the style of source text 124 in the translated text 130 by reading the style information from style attributes 108.

Further details on the methods used by the translation component and the reconstruction component are provided below with respect to FIGS. 3A-3G.

Figure 2:
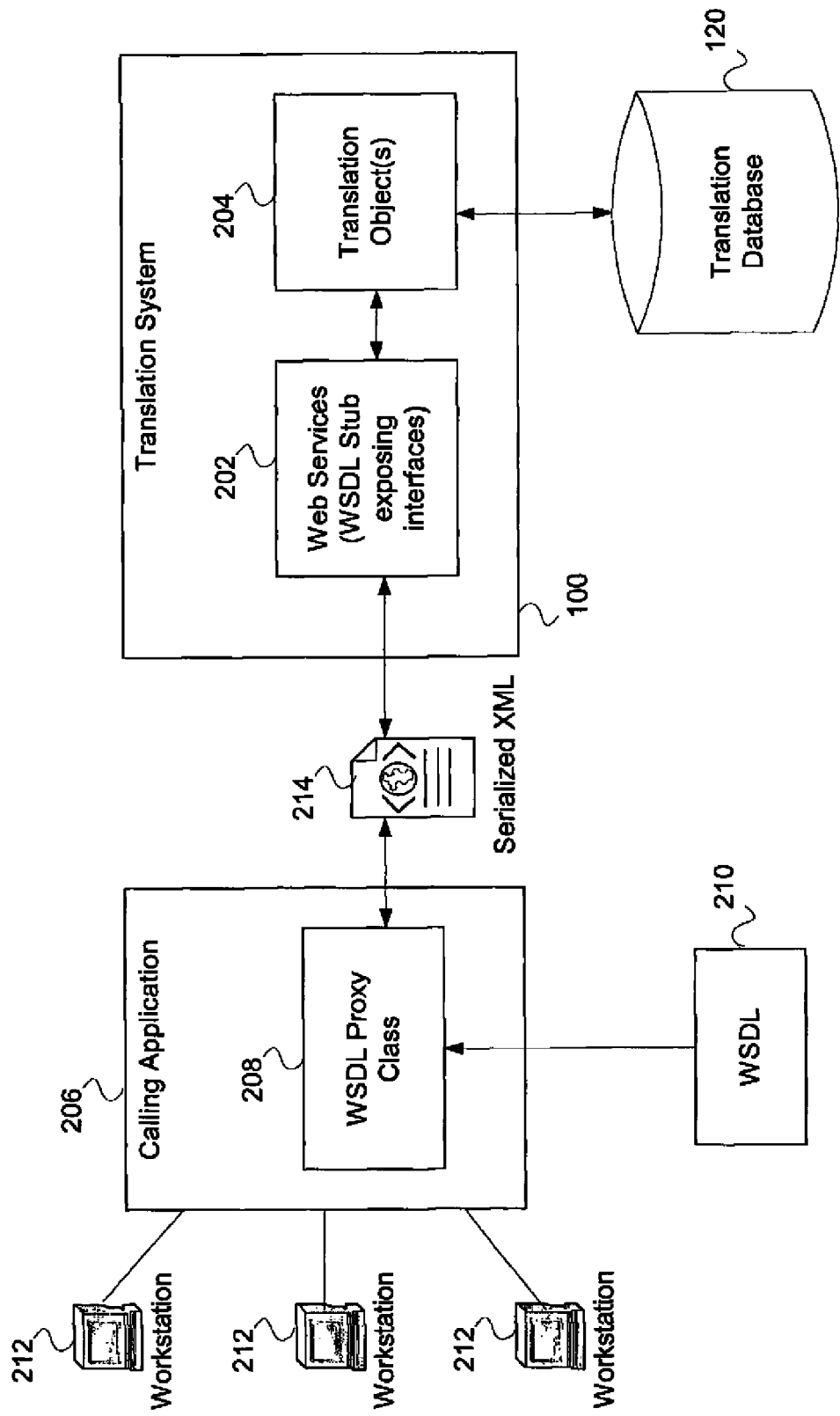
FIG. 2 is a block diagram illustrating components of a web based environment in which embodiments of the invention may be practiced.

FIG. 2 is a block diagram illustrating components of a web based environment in which embodiments of the invention may be practiced. In some embodiments, translation system 100 may be implemented as a web based translation system. In some embodiments, translation system 100 includes translation objects 204, and web services component 202. In some embodiments, translation objects 204 include functions and data that interfaces with translation database 120. These functions and data may include parser 104, translation component 110, reconstruct component 112, and functions that implement the methods described below with respect to FIGS. 3A-3G.

In some embodiments, web services component 202 is implemented using WSDL (Web Services Description Language), and exposes interfaces to translation objects 204. WSDL is an XML format for describing network services as a set of endpoints operating on messages containing either document-oriented or procedure-oriented information. The operations and messages may be described abstractly, and then bound to a concrete network protocol and message format to define an endpoint. Related endpoints may be combined into abstract endpoints (services). WSDL is extensible to allow description of endpoints and their messages regardless of what message formats or network protocols are used to communicate. WSDL is further described in Web Services Description Language (WSDL) Version 1.2 W3C Working Draft 3 Mar. 2003 and earlier versions by W3C (World Wide Web Consortium).

A calling application 206 on a workstation 212 may communicate with translation system 100 using serialized XML messages 214. Calling application 206 may be any type of application requiring translation services, including word processing programs and web client translation management programs. In some embodiments, calling application 206 includes WSDL proxy class 208. The proxy class 208 may include definitions for some or all of the following:

The URL for invoking the web service
The web methods available.
The web method input arguments and their data types
The output data type for each web method.

WSDL file 210 may be used to provide definitions for WSDL proxy class 208.

In some embodiments, the communication protocol used to send and receive the serial XML messages 214 is HTTP (Hypertext Transfer Protocol) and SOAP (Simple Object Access Protocol), a lightweight XML-based messaging protocol used to encode the information in Web service requests and response messages before sending them over a network.

FIGS. 3A-3G are flowcharts illustrating methods for translating text according to various embodiments of the invention. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 3A-3G are inclusive of acts that may be taken by an operating environment executing an exemplary embodiment of the invention.

Figure 3A:
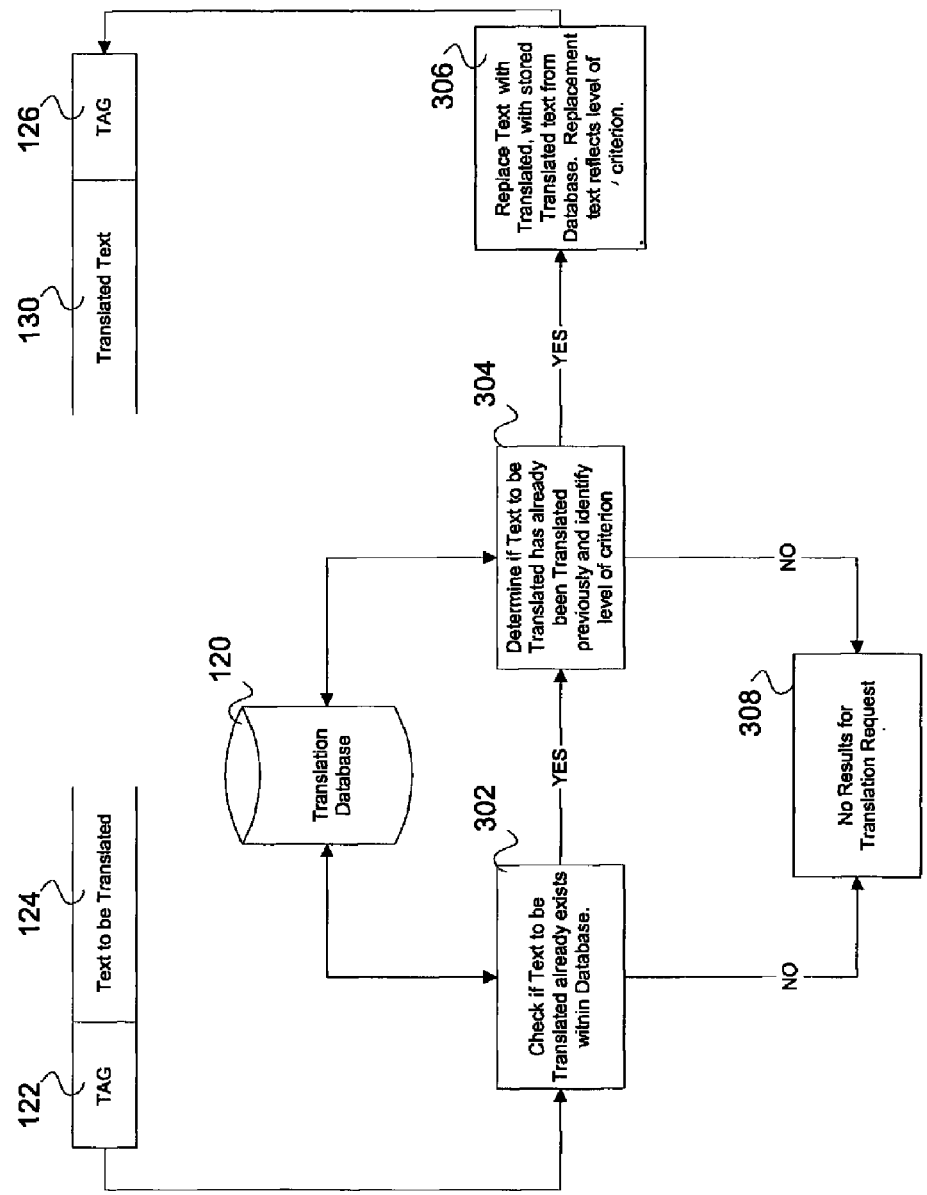
FIGS. 3A-3G are flowcharts illustrating methods for translating text according to various embodiments of the invention.

FIG. 3A illustrates a method according to an embodiment of the invention for matching a source text segment to a target translation text segment. The method may be invoked when a source text segment is submitted for translation to a system executing the method. The method begins by checking to see if the source text segment already exists in a translation database (block 302). If the source text does not exist, no translation can be provided (block 308).

If the source text segment is found in the database, then the system checks to see if source text has already been translated into the desired language (block 304). In some embodiments of the invention, additional checks are made to determine if there is a match on contextual criterion supplied to the system. The contextual criterion defines the context of the translation, and allows for different translations of the same source text depending on the context. If a translation into the desired language does not exist, or in some embodiments if the desired language translation exists, but there is no contextual criterion match, then no translation results can be provided (block 308).

Otherwise, if the desired language translation exists, and in some embodiments, if the contextual criterion match, then the translated text matching the source text is provided for replacing the source text (block 306). In some embodiments of the invention, the replacement translated text may be provided in a manner to visibly indicate the contextual criterion that was used to determine the match. In some embodiments, the translated text may be color coded according to the contextual criterion. In alternative embodiments, a symbol placed beside the replacement translated text may be used to represent to the user where the source or target text was obtained from within the context levels of the translation database. In still further embodiments, application screens display the context in textual format to the user to indicate where each text string was derived.

Figure 3B:
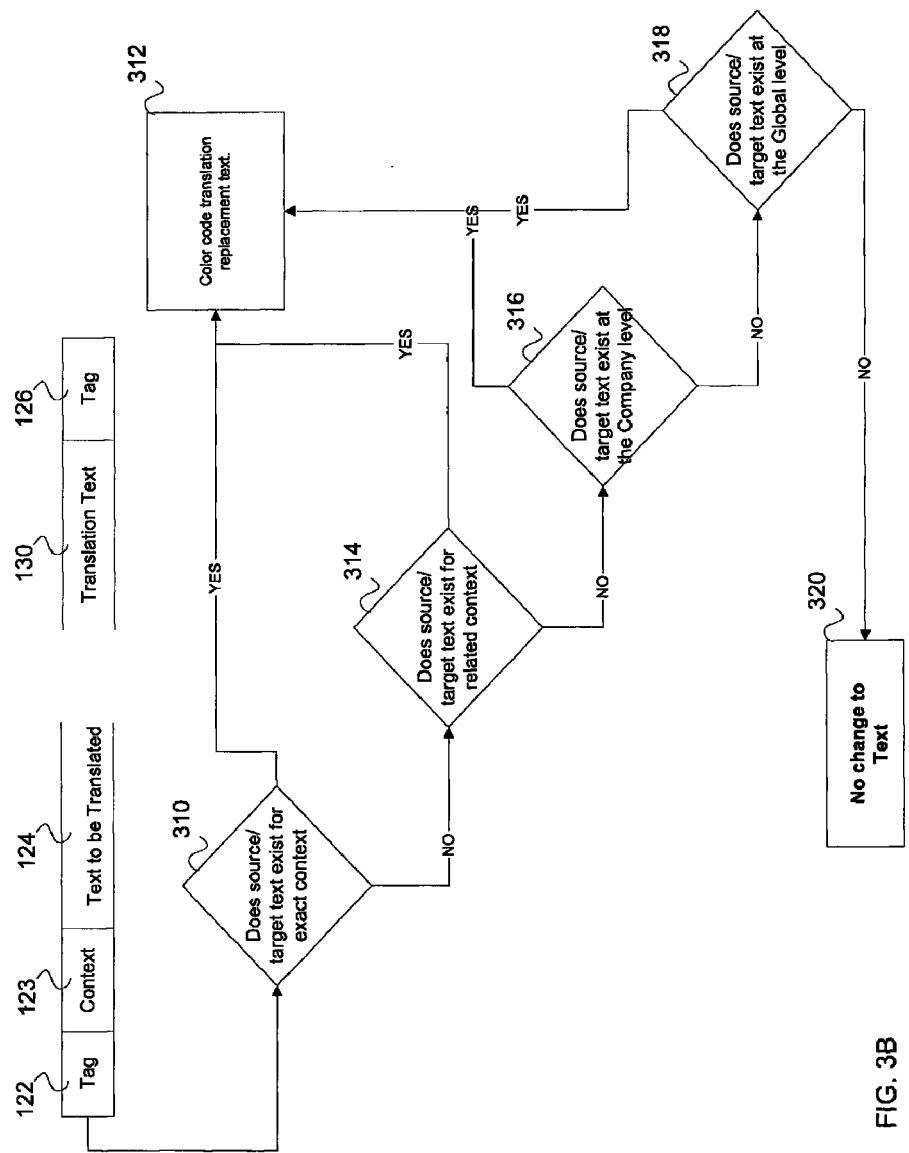

FIG. 3B provides further details on the contextual criterion matching used in some embodiments of the invention. The contextual criterion is a dynamic attribute in various embodiments. Contextual levels can comprise a definition of how a company wants to organize and repurpose textual data within an organization. Contextual criterion may be used to ensure that proper source and target text is being applied for a particular document. The contextual criterion values may and will differ from one company to the next. The management of these values may be controlled by the company's requirements and needs. Examples of such contextual criterion have been provided above with respect to FIG. 1B.

The method begins when source text to be translated is received. The system checks to determine if a target translation exists for the desired language where there is an exact match to the contextual criterion (block 310). If an exact contextual criterion match exists, then the translation text is provided and the contextual match level identified (block 312). In some embodiments, the contextual match level is indicated by color-coding the replacement text. In alternative embodiments, the contextual match level is indicated using data field interpretation, that is the contextual level may not be presented in a color coded scheme, but rather context tags are presented in the text so that the user so they may understand what context the text string is derived.

If an exact contextual match is not found, then the system determines if target translation text exists for contextual criterion related to the desired contextual criterion (block 314). As an example, a company may define contextual criteria for documents pertaining to dentistry, document pertaining to psychiatry, and documents pertaining to general medicine. Further, the company may indicate that the aforementioned contextual criteria are all related as medical contextual criteria. Thus if a source text from a dental document is received for translation, if an exact match to the dental contextual criterion does not exist, the system will also look to other related contextual criterion to determine if the related contextual criterion can supply a translation. If translation text can be provided for a related contextual criterion, the target translation text is supplied to the source seeking the translation (block 312). The replacement text may be color-coded in some embodiments to indicate that the level of the contextual match.

If a related contextual match cannot be found, then the system determines if target translation text exists at the company level (block 316). The company level includes any contextual criterion defined by a company. If a match exists at this level, the replacement translation text is provided (block 312). Again, in some embodiments, the replacement text may be color-coded to indicate the match occurred at the company level.

If a company level contextual match is not found, then the system determines if there is any target text in the database that matches the source text (block 318). This level of matching is referred to as a global level match. If any such translation text exists, it provided to the source seeking the translation (block 312). As noted above, some embodiments of the invention color-code the replacement text to indicate that the match was at the global level.

If no match can be found at the global level, no translation text exists and there is no change to the source text (block 320)

Those of skill in the art will appreciate that the method described above provides a hierarchy of matches for exact context, related context, company context, and global context. It will be appreciated that other hierarchies and levels may be provided and are within the scope of the present invention.

Figure 3C:
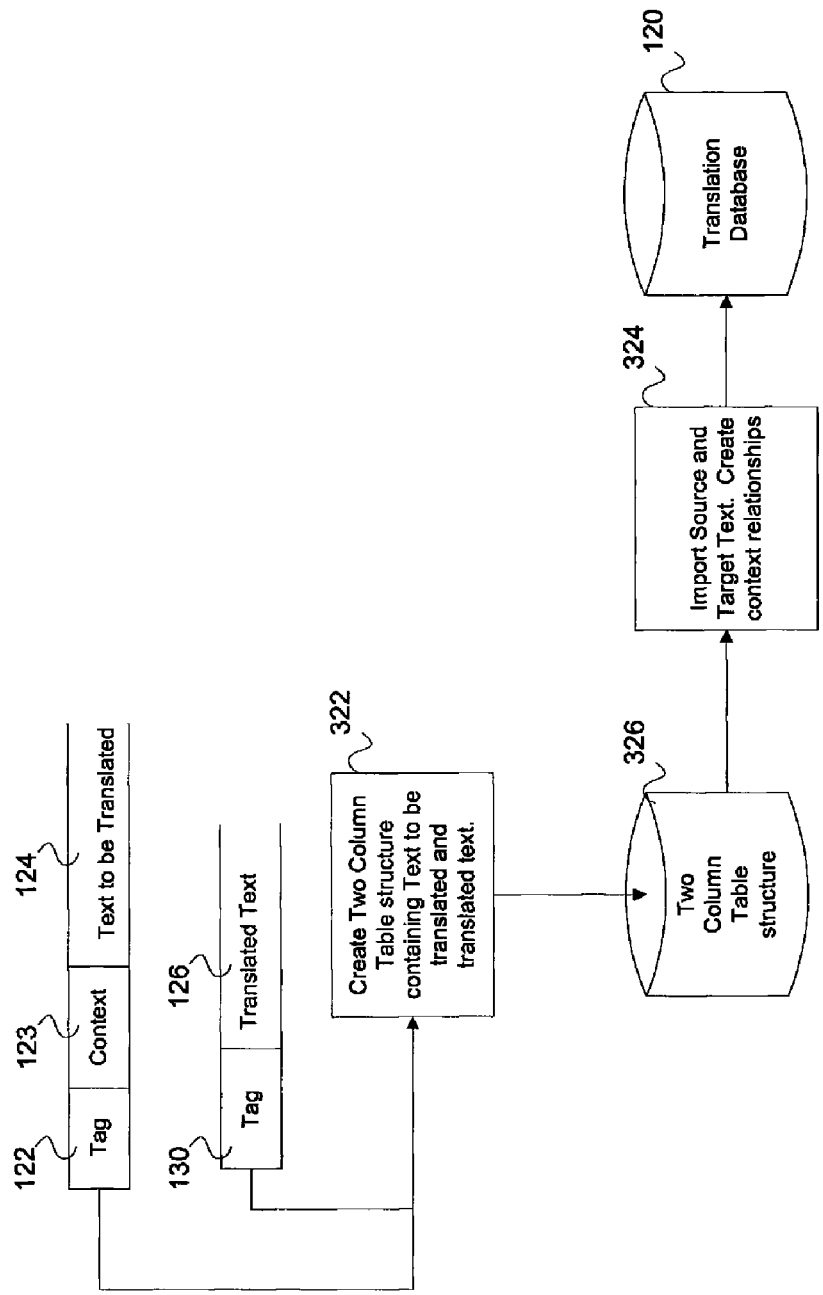

FIG. 3C illustrates a method for entering and loading translatable text into a database. As indicated above, there may be occasions where translation text cannot be provided because either there is no match to the source text at all in the database, or because there is no contextual criterion match (e.g blocks 308 and 320 in FIGS. 3A and 3B respectively). In some embodiments, the system executes the method illustrated in FIG. 3C to load new translatable text into the database. In some embodiments, a system executing the method presents a two column table structure 326 to the user or to a translator (block 322). One column contains the source text, the second column contains the target translation for the source text. The user may enter the translation manually, or a set of potential translations found in the database may be presented in the second column. The user relates the source text to the translation text and in some embodiments provides contextual criterion.

The data in the two column structure 326, along with the contextual criterion are then imported into the database (block 324). In some embodiments of the invention, version data is assigned to the source/target relationship, with each new source/target relationship resulting in a new version. Prior versions are saved in the translation database. This allows versioning of translated documents and provides a means to recover previous versions of translations. Additionally, in some embodiments of the invention, the translation must be approved prior to importing the source and target relationship into the translation database.

Figure 3D:
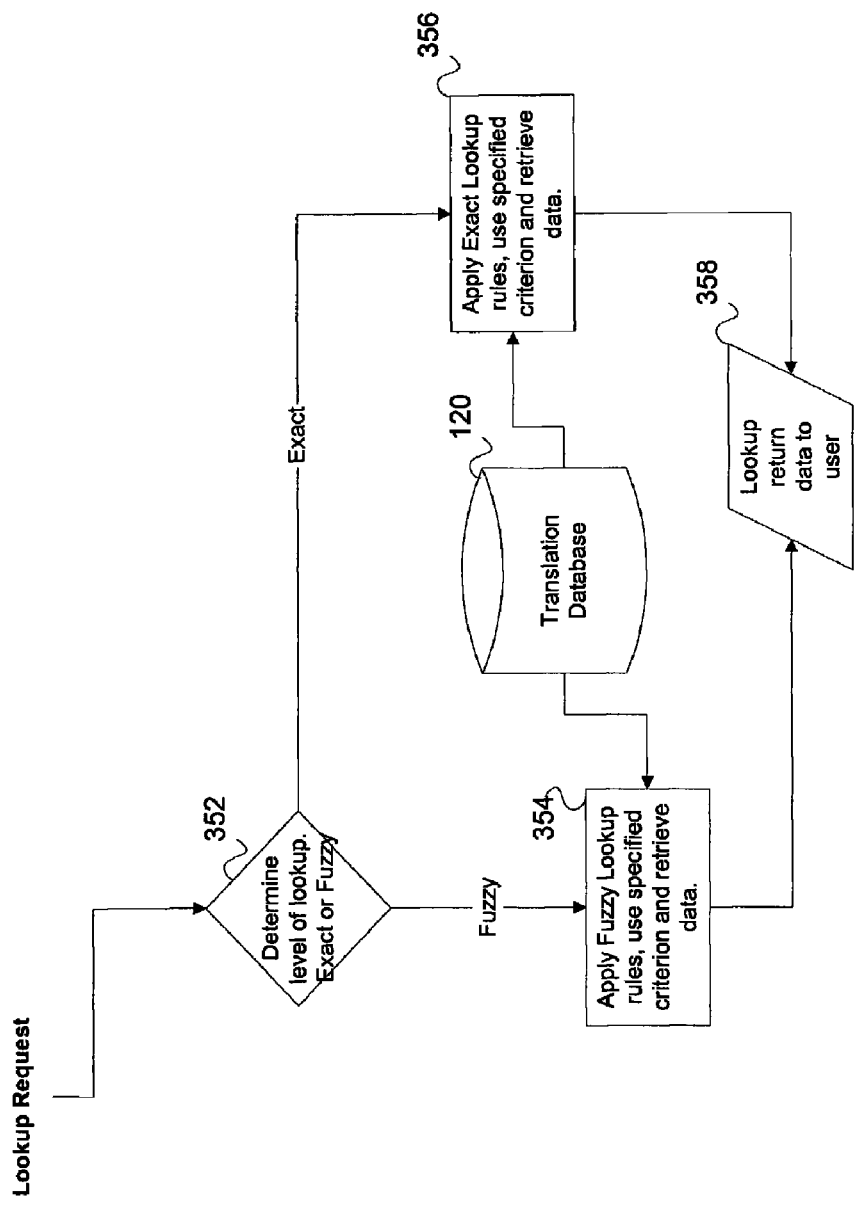

FIG. 3D illustrates a method for matching text to similar text in the translation database. Often sentences, phrases, or EOCTs within a particular document are very similar to previously approved and loaded sentences in the translation database. Therefore it is desirable do lookups within the stored data to help leverage (i.e. reuse) previously approved source and target text. This reduces cost in translating information in regard to a company's information. A method for matching translation text is provided in FIG. 3D. The method begins when a lookup request is received. The method determines the desired level of lookup (block 352). In some embodiments, the level may be exact match, or the level may be fuzzy match. However, those of skill in the art will appreciate that multiple levels of fuzzy matching may be provided.

If the match level is exact, then exact matches as illustrated in FIGS. 3A and 3B are used to retrieve the target translation text data (block 356). Otherwise, if the match level is fuzzy, then the text matching performed in FIGS. 3A and 3B is fuzzy matching. Methods of fuzzy matching text are known in the art. Generally, fuzzy matching utilizes more open rules, thereby allowing text to be returned that may not be exact but contains similar wording or structure of the sentence being requested for lookup.

In either case, matching data is returned to the source (block 358). Thus the lookup facility accommodates very detail searches but also allows for very wide scope queries.

The methods of FIGS. 3A and 3B are generally directed to providing translated text. In some embodiments of the invention, an authoring coach is provided that aids in the production of documents that are easily translated.

Figure 3E:
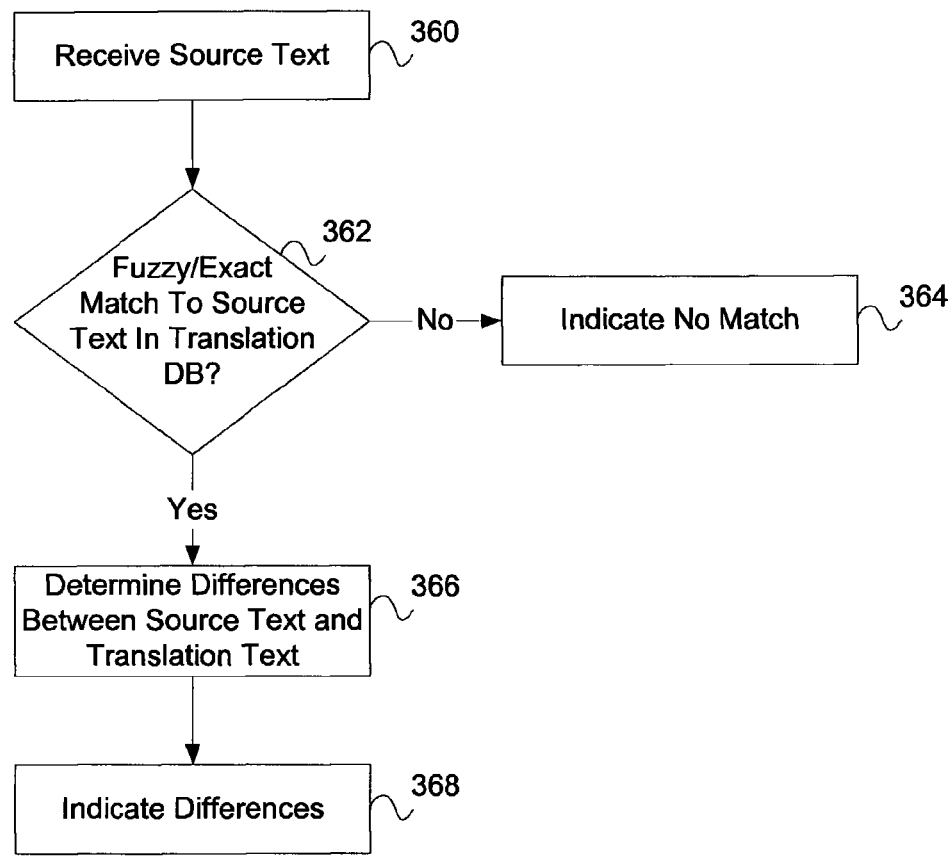

FIG. 3E illustrates a method for providing translatable text according to an embodiment of the invention. The method begins by receiving text to be entered in a document (block 360). The document may be a text document, a slide presentation, a spreadsheet, or a database. The text may comprise text segments that have been parsed in the document. In some embodiments, the segments are Expressions of Complete Thought.

Next, the system searches the translation database to determine if there is a match to the text segment (block 362). The search may be made in near real time as the user enters further text. As noted above, the match may be an exact match or a fuzzy match. In the case of an exact match, the user may be given a visual indication whether a match exists (block 364). If no match exists, the user may desire to change the text in order to find an exact or fuzzy match.

In the case of a fuzzy match, the system determines the difference between the received text and the fuzzy matching text (block 366). The differences between the received text and the fuzzy matching text may be indicated (block 368). In some embodiments, the word or words that differ may highlighted in the document. For example, the differing words may be underlined, italicized, displayed in a different color or other highlighting mechanism known in the art. Additionally, one or more matches in the source language may be presented to the user. The user may then select one of the matches that will then replace the source text, or the user may edit the source text directly so that the source text matches the translation text available in the translation database.

Using the method illustrated in FIG. 3E, an authoring coach may be provided. The authoring coach provides a mechanism for an author to create a source document that is comprised largely of text segments that have already been translated. Thus the source document can be readily translated into other languages if necessary, or when desired.

Figure 3F:
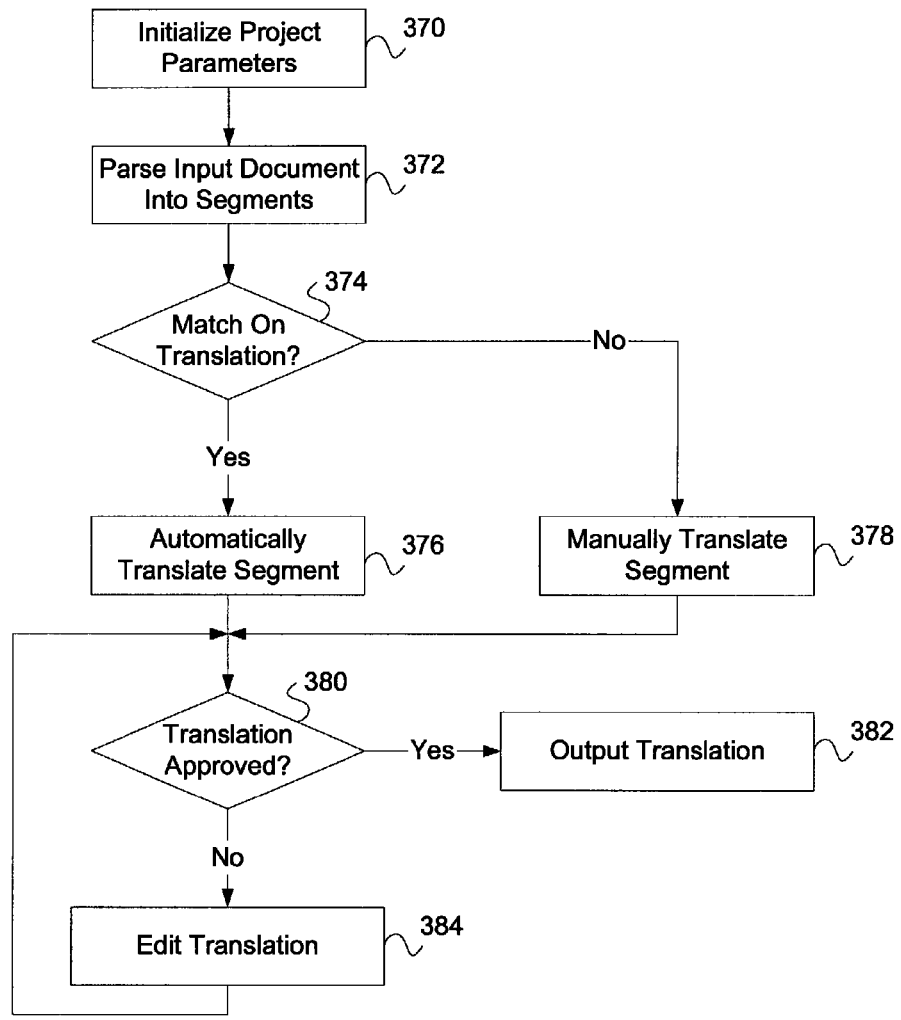

FIG. 3F is a flowchart illustrating a method managing a translation project according to an embodiment of the invention. The method begins by initializing project parameters (block 370). In some embodiments, the project parameters include the project name, source and target language or languages desired, the context for the project, whether exact matches are required for translation or whether fuzzy matching is allowed, dates associated with the project, the personnel involved with project, and contact details for the personnel. Different personnel on a project may have different roles. For example, a project may include a project manager, one or more document authors, one or more translators, and one or more persons responsible for approving translations. In some embodiments, the project may be managed using an application running on a web site. Personnel involved with the project may log in to the website using a userid and password combinations to identify and authenticate themselves to the system.

The system executing the method receives one or more input documents to be translated. The input document may be parsed into text segments as described above (block 372). In some embodiments, the text segments are EOCTs.

The system proceeds to determine if there are matches in the translation database for the text segments (block 374). As discussed above, the match may be an exact match or a fuzzy match depending on the project parameters. Further, in some embodiments the context will be used to determine matches as described above.

If no match can be found in the translation database, the text segment is manually translated (block 378). However, if a match is found, the text segment is automatically translated (block 376) using text in the translation database.

Next, in some embodiments, the system receives an indication as to whether or not the translation is approved (block 380). In some embodiments, both automatically translated and manually translated text may be subject to approval. In alternative embodiments, only manually translated text is subject to approval. If the text is approved, then the translation may be output (block 382). Otherwise, if the text is not approved, the translation may be edited (block 384). In some embodiments, the text may be submitted (or resubmitted) for manual translation at block 378. Alternatively, the text may be edited by an author or approver. The text may then be resubmitted for approval at block 380.

Figure 3G:
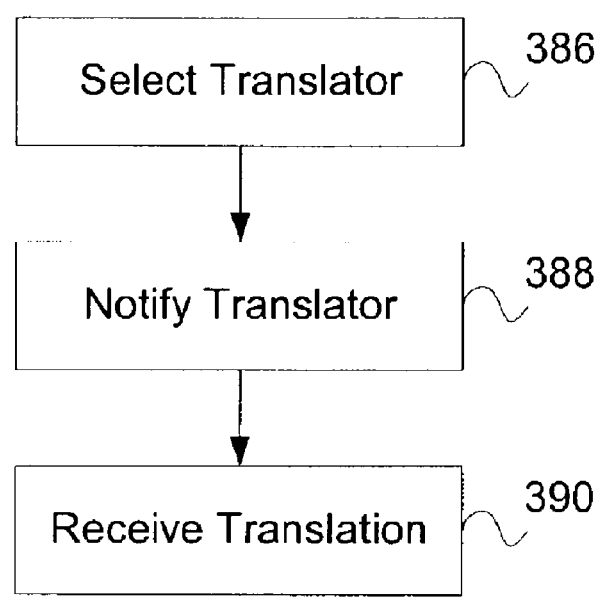

FIG. 3G provides further details regarding the manual (i.e. human) translation performed at block 378 in some embodiments of the invention. Manual translation begins by selecting a translator to perform the translation (block 366). In some embodiments, the translator may be selected as part of the parameters for a project. The selection of a translator may be driven by a number of factors, including expertise, cost, ranking, recommendation, etc. The ranking may be based on the quality of previous translations. For example, a translator may be ranked based on the number of translations that were approved as initially translated (i.e. those that did not require further changes).

Next, the translator may be notified that a translation is required (block 388). The notification may be by e-mail, fax, or a notice provided when the translator logs into the system.

Finally, the system receives the translation from the translator (block 390). As noted above, the translation may require approval from an approver prior to use in the project.

At various points in the above methods, translation text may be created, changed and approved. In some embodiments, the translation text is assigned a version, and the version identification changes when the translation text is changed. Additionally, when a document is translated, the translation version used is logged. In this manner, a document may be recreated exactly as it had been originally translated, even if the translation text is changed later.

Further, in some embodiments, the translator and/or approver of a translation may also be logged along with the translation version. This provides a means for identifying who was responsible for a given translation in the event that such information is required. For example, in a products liability case where the instructions provided are an issue in the case, it may be important to determine how and why a certain translation was used. In this case, the identity of the translator and the approver may be useful information.

FIGS. 4A-4E are illustrations of an exemplary web-based user interface according to various embodiments of the invention. The exemplary interfaces illustrated in FIGS. 4A-4F may be presented at various points in the methods described above in FIGS. 3F and 3G.

Figure 4A:
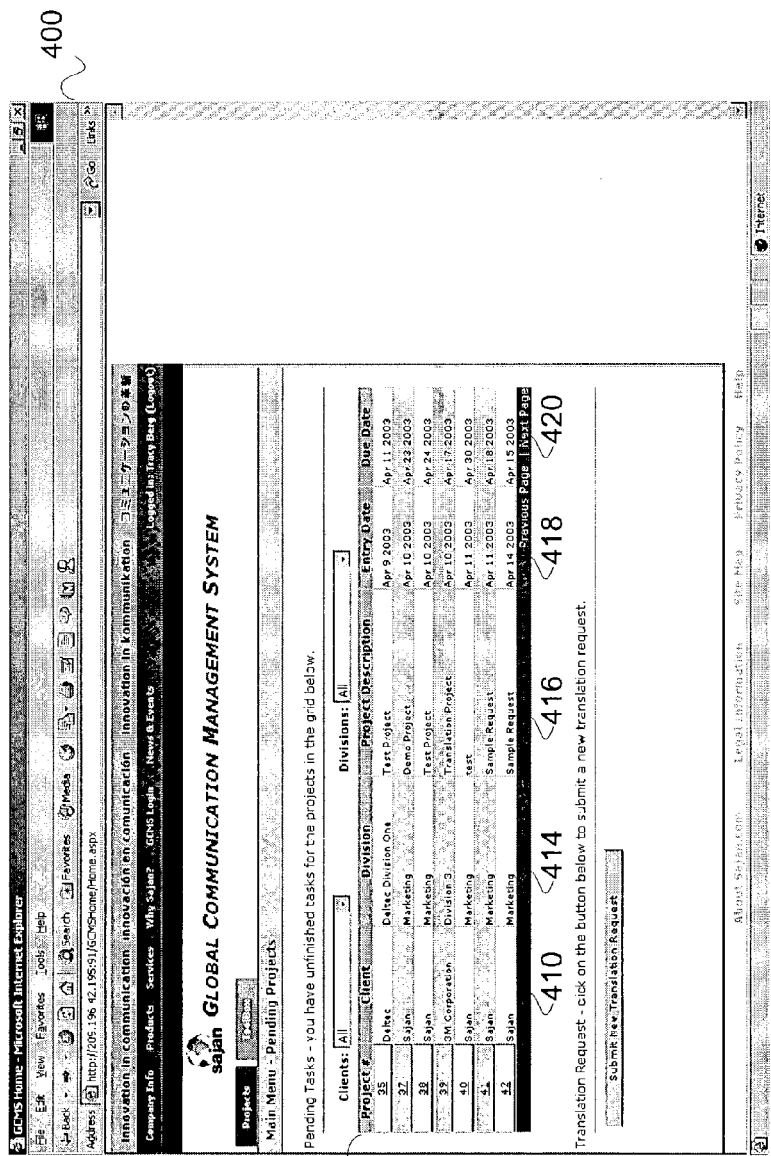

FIG. 4A illustrates an exemplary project selection screen 400 according to and embodiment of the invention. Project selection screen 400 includes a project list 402, with an entry in the list for active projects. In some embodiments, each project entry includes a client identifier 410, a division identifier 414, a project description 416, an entry date 418 and a project due date 420. Each of these items may be previously entered as project parameters when a project is initialized.

Figure 4B:
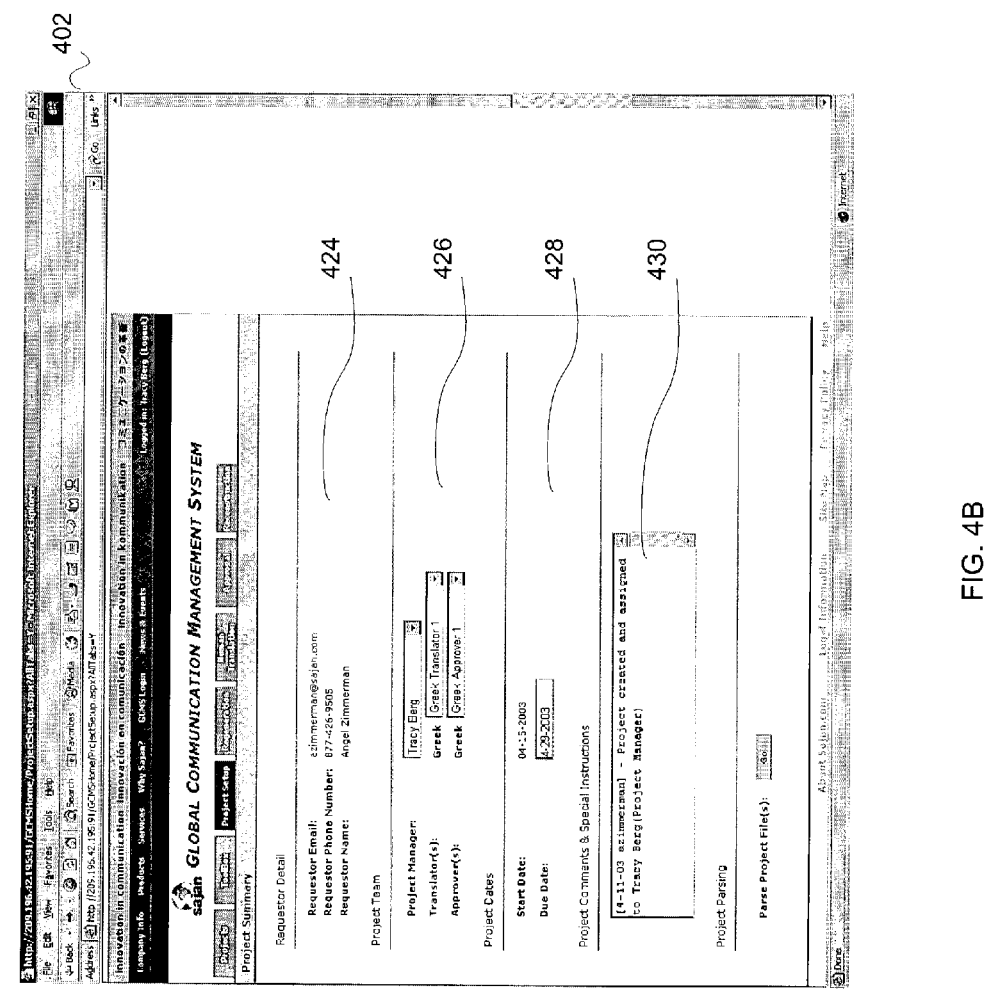

FIG. 4B illustrates an exemplary project summary screen 422 according to an embodiment of the invention. Project summary screen presents summary information regarding a project selected from the project list 402. In some embodiments, such summary information includes requestor detail 424, project team data 426, project dates data 428 and project comments 430. Requestor detail 424 includes data regarding the person or entity requesting the project. Project team data 426 includes data regarding personnel working on the project. In some embodiments, this includes one or more project managers, one or more translators, and one or more approvers. Project dates data 428 includes the project start date and the project due date in some embodiments. Project comments field 430 provides a field for entering comments or special instructions for the project.

Figure 4C:
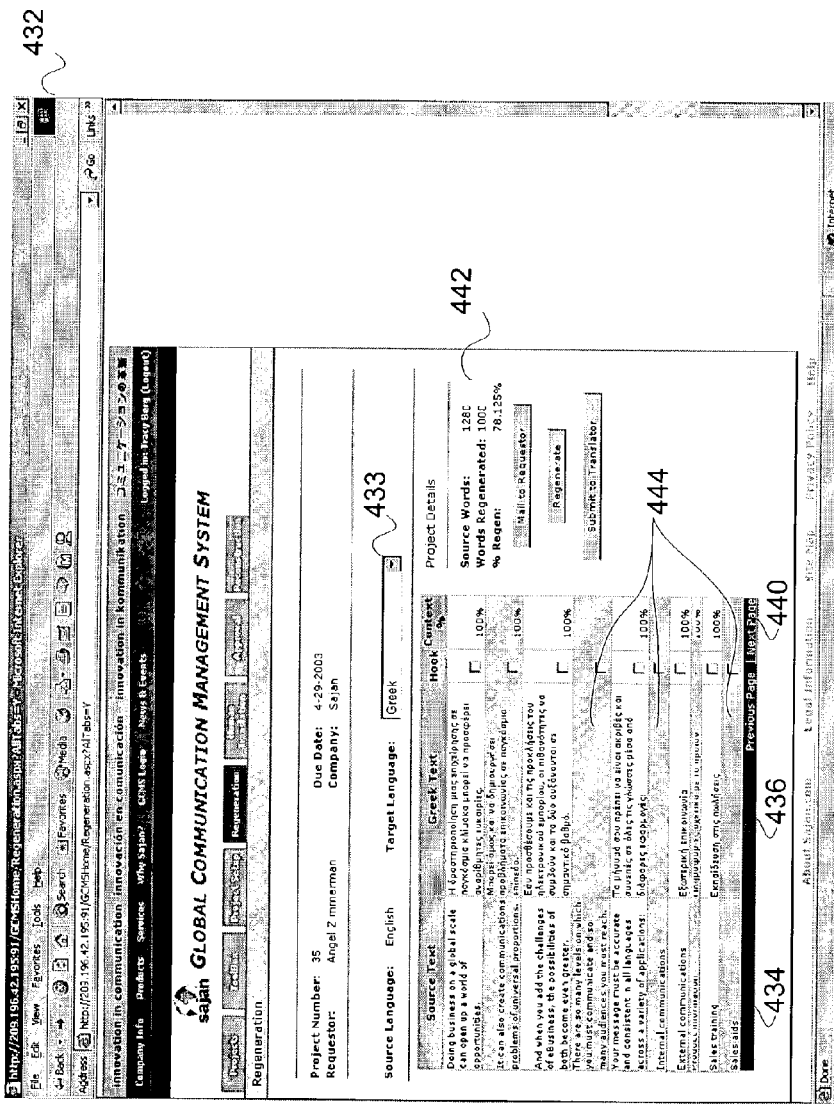

FIG. 4C illustrates an exemplary regeneration screen 432 according to an embodiment of the invention. In some embodiments, regeneration screen 432 includes a list of text segments parsed from an input document. For each text segment, a source text 434, target text 436, and a context percentage field 440 are presented. In addition, in some embodiments regeneration screen 432 includes a translation language field 433 and regeneration details 442.

Source text 434 comprises one or more text segments as parsed from an input document. Upon selecting a translation language from translation language field 433, target text 436 is populated with translated text in the selected language that is found in a translation database. If not translation text is found, target text 436 is blank as indicated by fields 444. Context percentage field 440 indicates whether an exact match or a fuzzy match was used in the translation.

Regeneration details provides information regarding how much of the source text could be automatically translated. The total number of source words and the number of words that could be translated are presented, along with a percentage of words that could be translated.

Figure 4D:
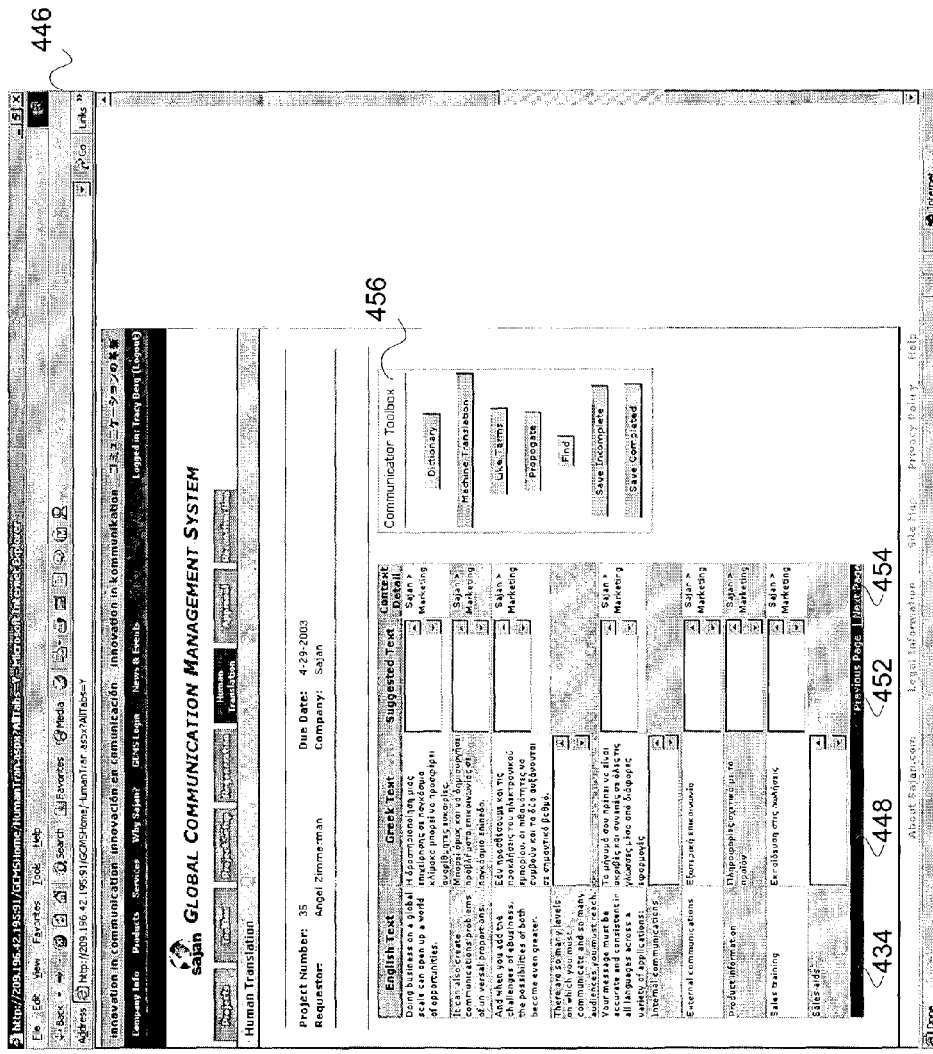

FIG. 4D illustrates an exemplary human translation screen 446 according to an embodiment of the invention. Human translation screen 446 in some embodiments includes a list of one or more source text 434, target text 448, suggested text 452 and context detail 454 for each text segment. In addition, some embodiments of the invention provide translation tools 456. Target text 448 is similar to target text 436, however for those fields that cannot be automatically translated, an editable field 450 is provided allowing a translator to enter a translation for source text 434. In addition, a translator may supply text in suggested text 452 if a translator feels that a better translation exists than the one automatically supplied in target text 448. Context details 454 provides an indication of the context that was used to match source text 434 to translation text 448. As discussed above, various levels of contextual matching may be used during the matching process.

Translation tools 456 provide various tools that a translator may require in the translation process. For example, in some embodiments, a dictionary interface is provided allowing a translator to perform an on-line lookup of selected word. A machine translation button may be provided to allow a translator to perform a machine (automated) translation of one or more selected words. A machine translation may comprise a word for word translation of the selected words, rather than a translation of an EOCT using contextual information.

In some embodiments, a propagate function is provided that searches within the source values for direct matches and populates the translation field with translated content. For example, a translator translates one occurrence of a source string. In order to save time and/or effort, the translation can be propagated throughout the remainder of the document for other occurrences of the source string.

Some embodiments include a find function. In these embodiments, the find function locates either source or target text.

Figure 4E:
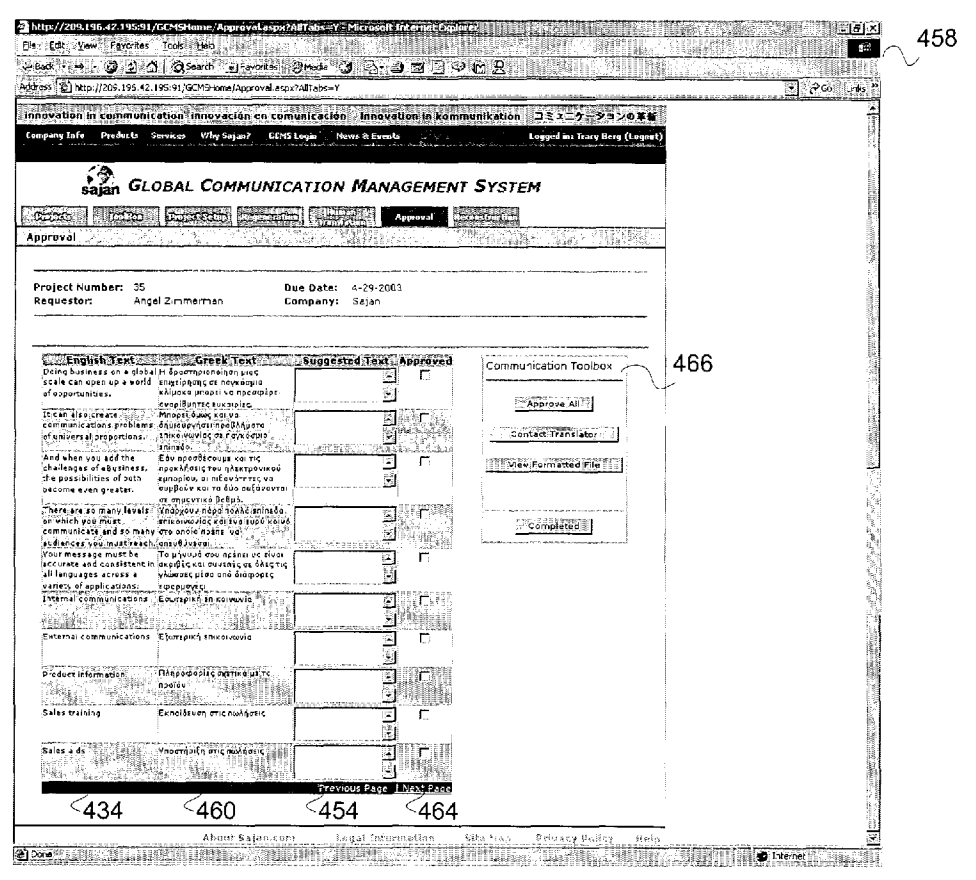

FIG. 4E provides an exemplary approval screen 458 according to an embodiment of the invention. In some embodiments, approval screen 458 includes a list of text segments parsed from an input document. For each text segment, a source text 434, target text 460, suggested text 454 and approval indicator 464 are provided. Target text 460 provides the final translated text resulting from either automated translation or human (manual) translation. Suggested text 454 provides an editable field where an person responsible approving translations may provide an alternative translation to that provided in target text 460. Approval indicator 464 provides an interface for the person responsible approving translations to indicate that the translation in target text 460, or suggested text 454 is approved for final output.

Approval screen 458 in some embodiments provides a communications tools interface 466. Communications tools may include an "approve all" interface allowing an approver to mark all target text 460 or suggested text 454 as approved without having to individually approve each segment. A "contact translator" provides an interface for an approver to contact the translator responsible for translating a segment of source text. The contact translator may bring up an e-mail interface for sending e-mail to the translator. A "view formatted file" interface brings up a screen showing how the source text will look if the translations are approved. The formatted file uses the formatting information saved during the initial parsing of the input file to display the translated text in the same format as the source text.

Figure 5A:
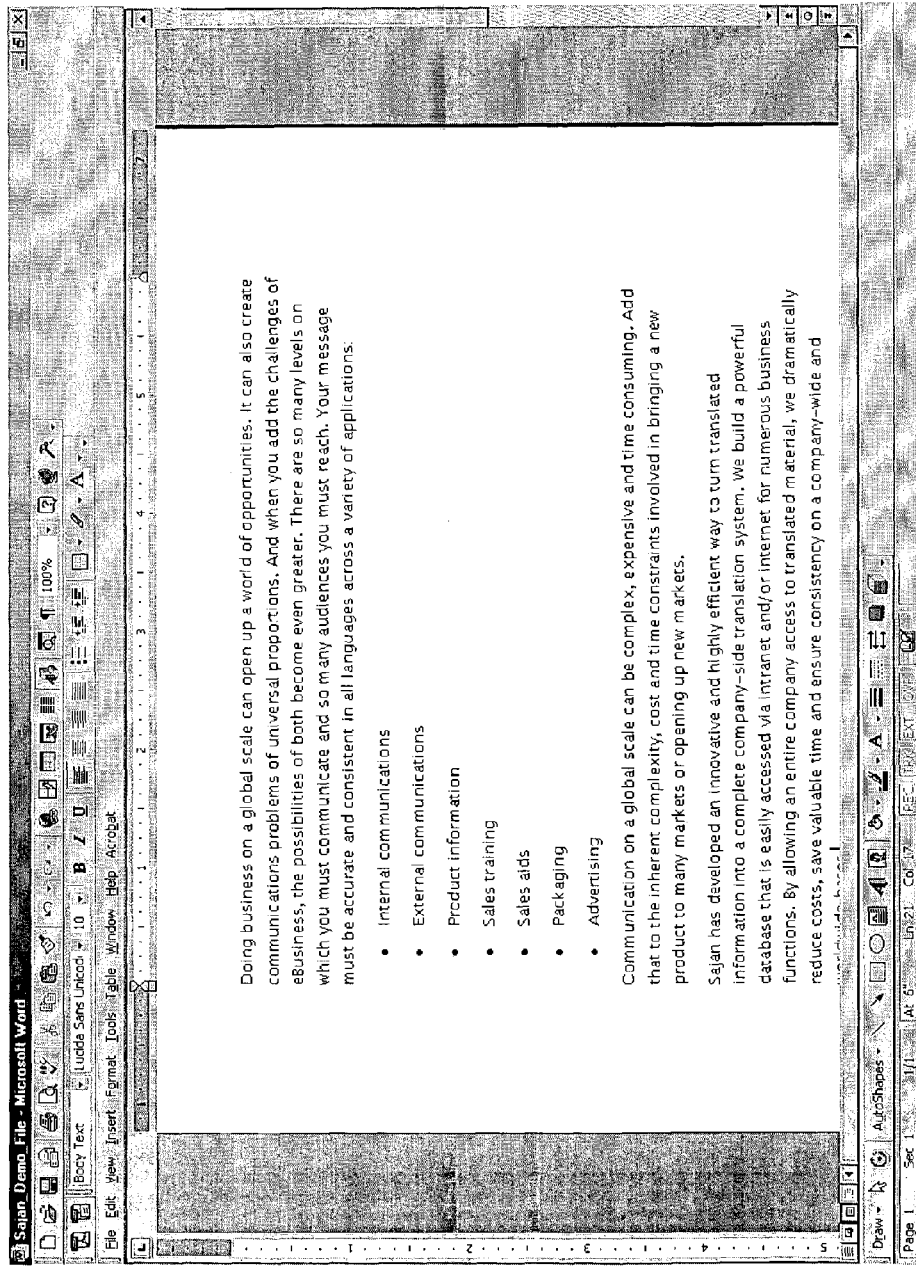
FIGS. 5A and 5B illustrate an exemplary translation performed by an embodiment of the invention.
Figure 5B:
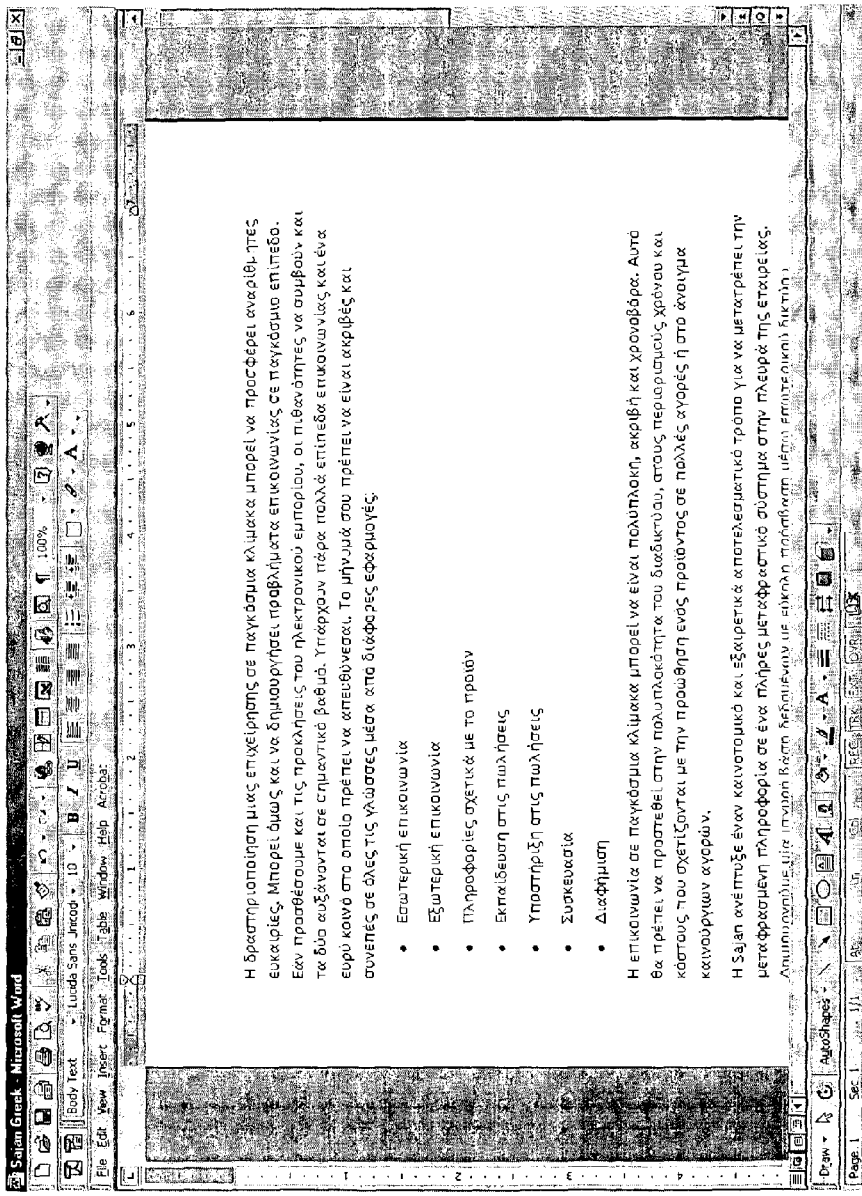

FIGS. 5A and 5B provide an example of the translation described above. FIG. 5A is an example of source text in the English language. As illustrated, the source text contains a number of paragraphs, and includes a bulleted list of elements. FIG. 5B illustrates the source text after translation into the Greek language using the systems and methods of an embodiment of the invention. As can be seen, the style of the source document has been preserved, with the same number of paragraphs and the same bulleted list of elements.

CONCLUSION

Systems and methods for providing translatable text are disclosed. The systems and methods described provide advantages over previous systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A computerized method for translating text, the method comprising:
   receiving a set of text to be translated from a first source, the set of text comprising an expression of complete thought;
   receiving one or more translations for the set of text; inserting the one or more translations and a context for each of the one or more translations into a translation database to create one or more reusable translated text segments; wherein the context is part of a hierarchy of contexts having a plurality of levels wherein the plurality of levels define a search order;
   receiving a translation language indicator;
   receiving a set of text to be translated from a second source;
   receiving source context data for the translation;
   parsing the set of text into a plurality of input text segments, wherein the text segments comprise a plurality of words comprising an expression of complete thought; and
   for each of at least a subset of the plurality of input text segments:
   retrieving from the translation database a reusable translated text segment of the one or more reusable translated text segments in the translation language corresponding to the input text segment, wherein context data is associated with the plurality of words for the reusable translated text segment and corresponds to the source context data and is selected according to the level in the hierarchy of contexts, and wherein the context data indicates a meaning or intended audience for the reusable translated text;
   outputting the reusable translated text segment; and
   coding the translated text in the output according to the level in the hierarchy of context where the match exists.

2. The method of claim 1, further comprising searching the translation database for an exact match to the input text segment.

3. The method of claim 1, further comprising searching the translation database for a fuzzy match to the input text segment.

4. The method of claim 1, wherein the hierarchy of contexts includes a company criterion.

5. The method of claim 1, wherein the coding is a color coding.

6. The method of claim 1, the method further comprising:
   determining one or more style attributes, wherein each of the style attributes are associated with an input text segment of the plurality of input text segments; and
   applying the one or more style attributes to the translated text segment.

7. A method for authoring a source document, the method comprising:
   receiving a set of text to be translated from a first source, the set of text comprising an expression of complete thought;
   receiving one or more translations for the set of text;
   inserting the one or more translations and a context for each of the one or more translations into a translation database to create one or more reusable translated text segments; wherein the context is part of a hierarchy of contexts having a plurality of levels wherein the plurality of levels define a search order;

receiving a source text segment for the source document, wherein the source text segment comprises an expression of complete thought formed from a plurality of words;

determining if any of the reusable translated text segments in the translation database are a match to the source text segment;

indicating the results of the match determination;

upon determining that no match exists, querying the database to determine if similar text exists in the translation database and if so, providing the similar text as a suggested replacement for the source text; and coding the translated text in the output according to the level in the hierarchy of context where the match exists.

8. The method of claim 7, wherein indicating the results includes highlighting the source text segment according to the results of the match.

9. The method of claim 8, wherein highlighting the source text segment includes highlighting selected from the group consisting of color coding, underlining and italicizing.

10. A system for translating text, the system comprising:

a translation database operable to store one or more reusable translated text segments, each of the reusable translated text segments comprising an expression of complete thought formed from a previous translation, the translation database further operable to store a context for each of the reusable translated text segments;

a parser operable to parse a source document into a plurality of text segments and a plurality of style attributes, each of the style attributes associated with a text segment of the plurality of text segments, the text segment comprising a plurality of words forming an expression of complete thought;

a translation component operable to query and retrieve from the translation database a reusable translated text segment that matches the text segment in accordance with a match criterion, wherein the match criterion includes a text match and a context value match, wherein the context value is within of a hierarchy of contexts having a plurality of levels wherein the plurality of levels define a search order and wherein the context value indicates a meaning or intended audience for the translated text and further wherein the context data is associated with the plurality of words of the text segment;

a reconstruction component operable to output the reusable translated text segment according to the style attribute; and coding the translated text in the output according to the level in the hierarchy of context where the match exists.

11. The system of claim 10, wherein the text match is a fuzzy text match.

12. The system of claim 10, wherein the parser parses the source document into XML and wherein the style attributes are stored in a style sheet.

13. The system of claim 10, wherein the parser, translation component and reconstruction component are operably coupled to a web server, and wherein translation requests are provided to the web server through a web services component.

14. The system of claim 10 wherein the translation requests are received as serialized XML.

* * * * *